June 3, 1952  A. E. ASHLEMAN  2,598,964
AUTOMOBILE DIRECTIONAL SIGNAL
Filed Aug. 22, 1949  2 SHEETS—SHEET 1
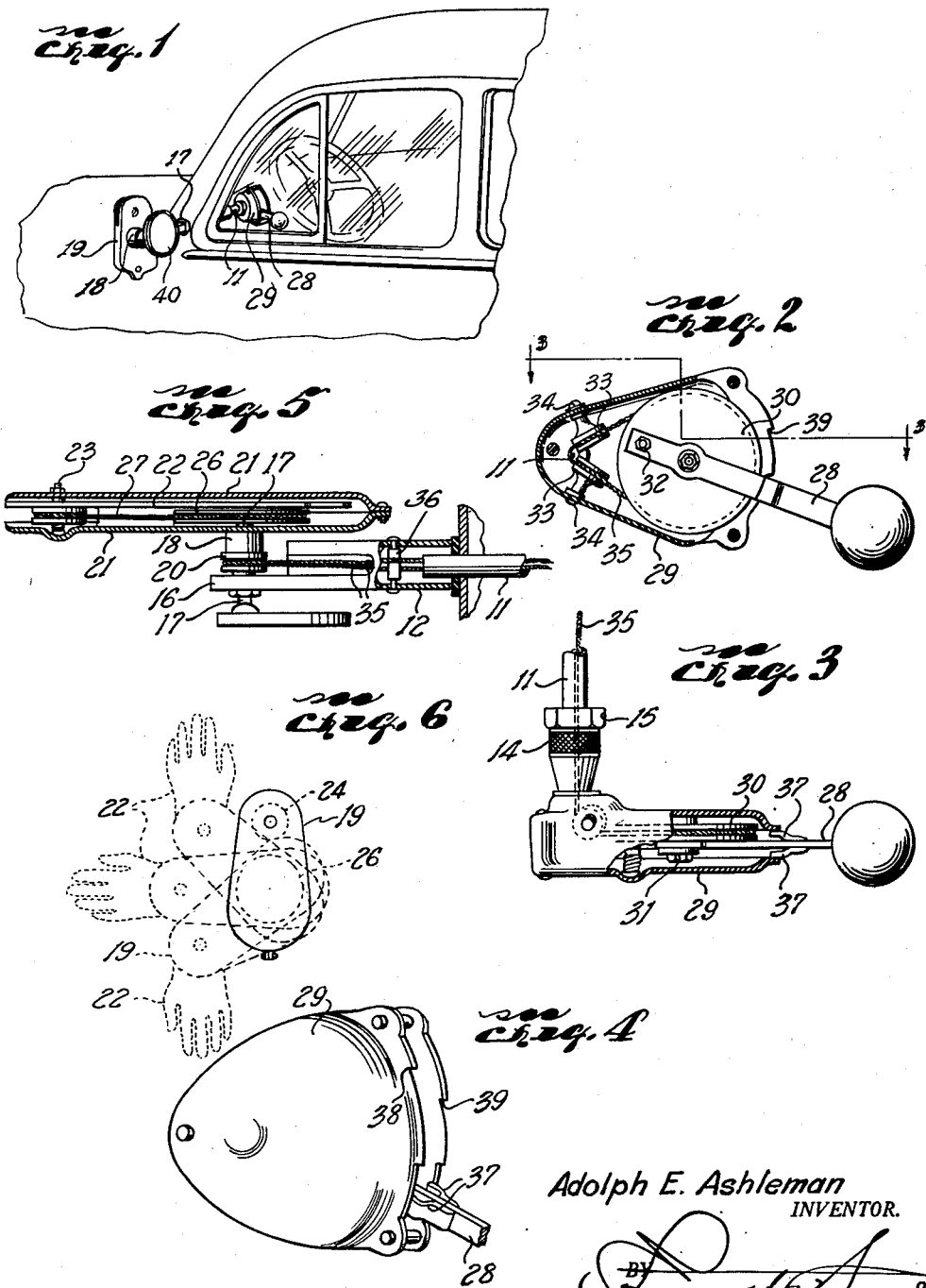
Adolph E. Ashleman
INVENTOR.
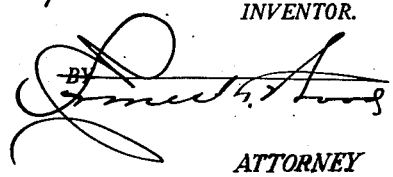
ATTORNEY June 3, 1952 — A. E. ASHLEMAN — 2,598,964
AUTOMOBILE DIRECTIONAL SIGNAL
Filed Aug. 22, 1949 — 2 SHEETS—SHEET 2
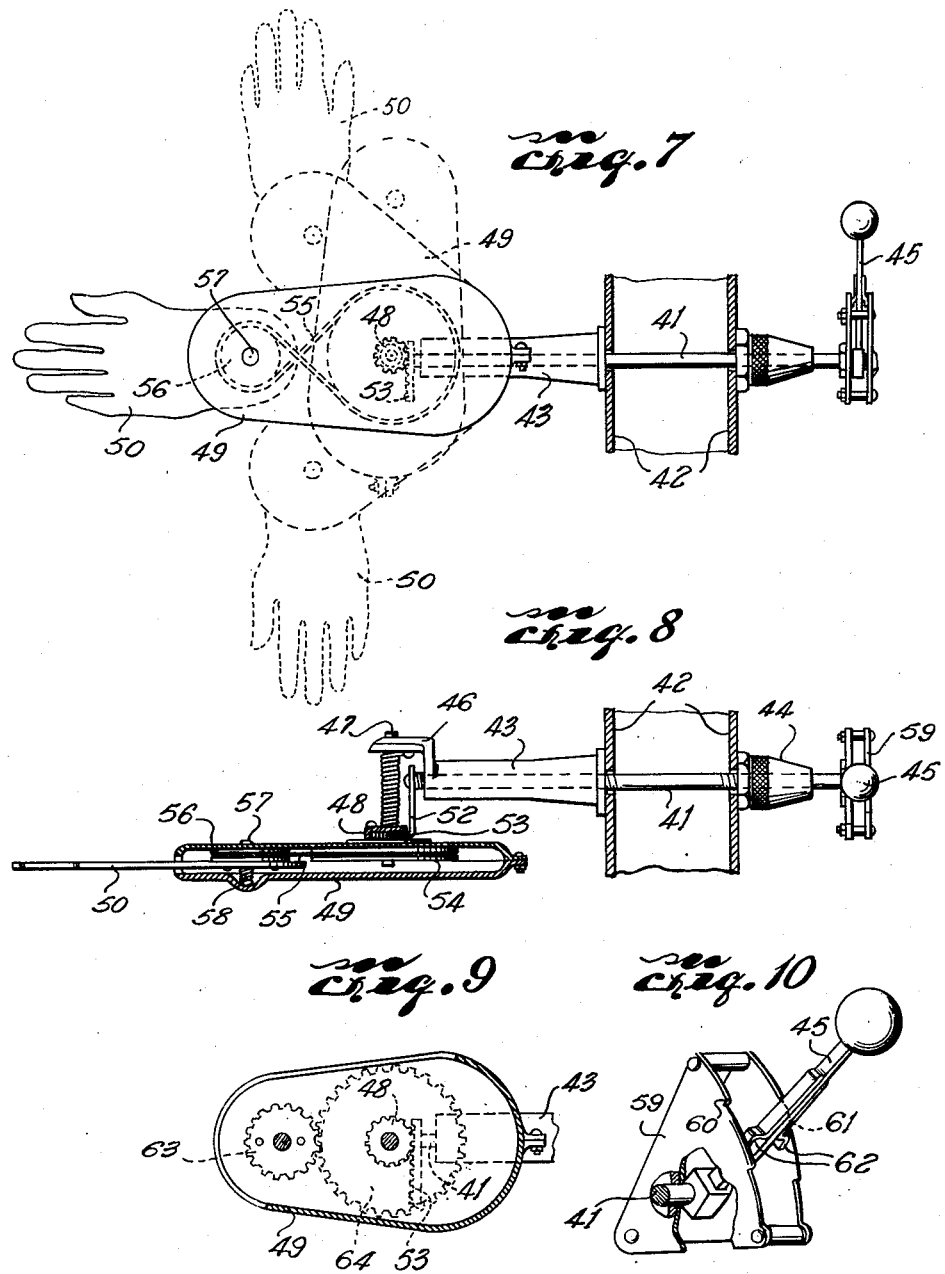
Adolph E. Ashleman
INVENTOR.
ATTORNEY Patented June 3, 1952

2,598,964

UNITED STATES PATENT OFFICE 2,598,964

AUTOMOBILE DIRECTIONAL SIGNAL

Adolph E. Ashleman, Waco, Tex.

Application August 22, 1949, Serial No. 111,678

2 Claims. (Cl. 116—52)

This invention relates to automobile directional signals and particularly to hand indicators operable manually from the operator's position in the vehicle.

The principal object of the invention is to provide simple mechanism for manipulating a semaphore type of device, attached to the driver's side of a vehicle, by means of a control lever interiorly of the vehicle to execute the three major signals, i. e., "right turn," "left turn" and "slow" and thus warn a trailing motorist of the intentions of the driver of the preceding vehicle. The invention resides in the novel construction and arrangement of parts by which is made possible the oscillative displacement of the semaphore in one plane through manipulation of the actuating lever in a plane at right angles to the semaphore and also, the provision for predetermining the three major positions of the semaphore through lateral displacement of the actuating lever with respect to its arcuate course in moving the semaphore.

Other objects will become apparent as the description proceeds, taken in connection with the accompanying drawings, wherein:

Figure 1 is a perspective view showing the manner in which the invention is attached to a vehicle.

Figure 2 is a detail view of the operating lever and its housing, the latter being shown in longitudinal section to reveal working parts therein.

Figure 3 is a top plan view of the operating lever and housing, partly in section as taken on line 3—3 of Figure 2.

Figure 4 is a perspective view of the operating lever housing per se.

Figure 5 is a top plan view of the mounting and signal housing, partly in longitudinal section.

Figure 6 is a detail view showing various positions of the signal and housing therefor.

Figure 7 is a front elevational view of a slightly modified form of signal and operating means.

Figure 8 is a plan view of the mounting shown in Figure 6, showing the signal housing in longitudinal section.

Figure 9 is a detail view of the signal housing in longitudinal section, showing a modified form of motion imparting means, and Figure 10 is a perspective view of the operating lever and its housing per se.

Continuing with a more detailed description of the drawing, reference is primarily made to Figures 1 to 6 inclusive wherein numeral 10 denotes generally an automobile, shown fragmentarily, to reveal the position of the invention thereon.

The invention in the form shown in these figures consists primarily of a small tube 11 which is adapted to be extended through aligned holes drilled in the inner and outer walls of the automobile body. Affixed to the outer portion of the tube 11 is a signal mounting 12, to the inner end of which is affixed a plate 13 adapted to bear against the surface of the outer wall of the vehicle body. The inner end of the tube 11 is threaded to receive a union 14, the nut 15 of which bears against the surface of the inner wall of the vehicle, hence, the tube is firmly secured against longitudinal and rotative displacement.

A portion 16 of the signal mounting 12 extends outwardly to support a lateral stub shaft 17 which is stationary with the mounting but on this shaft is rotatably mounted a collar 18, the latter being affixed at one end to the face of a signal housing 19. To the opposite end of the collar 18 is affixed a pulley 20, to which further reference will be made presently.

The signal housing 19 consists of two plates 21 having confronting flanges about their operimeters which hold the plates in spaced relationship to accommodate therebetween a flat semaphore 22 having the profile of the human hand, as shown. The semaphore 22 is rotatably mounted on a small shaft 23 secured to one of the plates 21 and extending laterally therefrom between the plates at one end of the housing. Also rotatable on the shaft 23 is a grooved wheel or pulley 24 which is affixed to the semaphore or hand signal 22. A small compression spring 25 on the shaft 23 prevents longitudinal displacement of the pulley and signal on the shaft.

The shaft 17, on which the signal housing 19 is rotatably mounted, also carries a grooved wheel or pulley 26, located between the housing plates 21. The circumference of pulley 26 is twice that of pulley 24, hence the ratio is 2 to 1. A small wire cable 27 is mounted on these pulleys and is twisted so that the housing 19 and signal hand 22 will rotate in the same direction but at slower speeds, due to the differential ratio between the pulleys 24 and 26.

To effect operation of the signal housing 19 and signal 22, an operating lever 28 is mounted in the lever housing 29. The housing 29 is affixed to the union 14 which secures the mounting tube 11 to the vehicle body. A pulley 30 is rotatably arranged in the housing 29 on a shaft 31 and the inner end of the operating lever is affixed to this pulley as at 32 (Fig. 3), hence oscillation of the lever 28 will cause similar movement of the pulley 30.

Also mounted within the housing 29 is a pair of angular pulleys 33, rotatable on stub shafts 34. A cable 35 is disposed over the pulley 30 and one lead thereof extends over one of the angular pulleys 33 and through the mounting tube 11, thence around the pulley 20 and back through the tube 11, passing over the companion angular pulley 33. A transversely mounted roller 36 (Fig. 5) holds the leads of the cable or belt 35 in spaced relationship.

It is clearly apparent from the foregoing that as the operating lever 28 is moved upwardly in the slot provided in the front of the lever housing 29, the pulley 30 will be revolved in a counter-clockwise direction and in so doing, will cause the pulley 20 and signal housing 10 to move in like direction. Since the larger pulley 26 within the signal housing remains stationary as the signal housing 19 is rotated, the belt 27 connecting this pulley and pulley 24 will cause the latter to rotate also in a counterclockwise direction but at twice the speed of rotation of the housing 19 because of the difference in ratio of the two pulleys. Accordingly, when the housing 19 assumes a position approximating 45° from its normally vertical position, the hand 22 will have moved out of the side of the housing to assume a vertical position, as revealed in dotted lines in Figure 6. As the operating lever 28 is continued upwardly, the housing 19 is moved to the horizontal position shown in this figure and in the position of the housing, the hand 22 is likewise horizontal. The third and last position of the hand 22 is the inverted position also shown in Figure 6, when the housing 19 lies in a position approximately 135° from its normally inoperative position. When the operating lever 28 is moved downwardly in its housing 29 to the lowest position, the housing 19 resumes its vertical position while the hand 22 moves to concealed position therein.

The positions of the hand signal 22 described in the preceding paragraph represent respectively the right turn, left turn and slow or stop signals.

In order that the various positions of the hand signal 22 may be predetermined, the walls of the housing 29 defining the arcuated opening in which the lever 28 moves are each provided with beveled protuberances, each formed with a gradual incline and an abrupt drop. The lever 28 has affixed to each side thereof a finger 37. As the lever is thrust to the left as it is moved upwardly, the finger 37 is brought up against the abutment 38 in the left wall of the housing 29. The hand signal 22 is thus stopped in the "left turn" position. When the lever is shifted to the right and moved upwardly so that the finger 37 will engage the abutment 39, the hand 22 will be in the "right turn" position while "slow" or "stop" position is indicated by holding the lever in a neutral position as it is moved to the extreme raised position in the housing 29.

A rear view mirror 40 is mounted to the outer end of the shaft 17 which latter is stationary and serves as the support for the signal housing, as described.

In Figures 7 to 10 inclusive is shown a modified form of the invention. A shaft 41 of small diameter is disposed in aligned apertures made by drilling through the outer and inner walls 42 of the automobile body. A mounting arm 43 embraces the shaft 41 and abuts the exterior wall of the vehicle. A union 44 embraces the shaft on the inside of the vehicle and holds the shaft against longitudinal displacement although permits rotation thereof which is effected by the operating lever 45 affixed to the inner end thereof.

The outer end of the mounting arm 43 has an L-shaped bracket 46 formed thereon and retains one end of a shaft 47 which is disposed at right angles to the shaft 41. The shaft 47 is stationary with the mounting arm 43 but rotatable on this shaft is a pinion 48 which latter is affixed to a signal housing 49.

The signal housing 49 is made up of two parallel plates having confronting edge flanges which are omitted along one edge of the housing so that a hand signal 50 may move into and out of the housing in the manner to be presently explained. A coil spring 51 surrounds the shaft 47 and bears against the pinion to obviate rattling which might occur by reason of looseness between the parts.

Affixed to the outer end of the signal operating shaft 41 is an arm 52. This arm extends into close proximity with the pinion 48 and carries a gear rack 53 which engages the pinion. Obviously then, as the operating lever 45 is oscillated, the rack 53 will be similarly moved to effect rotative movement of the pinion 48. As this occurs, the signal housing 49 will be swung in an arc on the stationary shaft 47, to assume the variety of positions shown in Figure 7.

Within the housing 49 is a pulley 54 which is stationary on the fixed shaft 47 and mounted in the groove of this pulley is wire belt 55 which is twisted and engages a smaller pulley 56, whose ratio is 2 to 1 with respect to pulley 54. The smaller pulley 56 is mounted on a small shaft 57 which also carries the hand signal 50. A compression spring 58 on the shaft 57 prevents longitudinal displacement of the pulley and signal on the shaft.

The lever 45 is operative in a housing 59 composed of substantially triangular parallel plates, the forward edges thereof being formed with stops 60 and 61 against which fingers 62 of the lever 45 are brought to predetermine the position of the signal 50.

In operation and assuming that a left turn is to be indicated, the lever 45 is shifted to the left and moved upwardly to engage a finger 62 with the stop or abutment 60. The shaft 41 will be turned to move the rack 53 and thus turn the signal housing 49 on the shaft 47 through the pinion 48. Since the pulley 54 does not turn, the belt 55 thereon will cause the smaller pulley 56 to turn in the same direction as the housing 49 but at twice the speed. Accordingly, when the operating lever 45 is positioned so that the left finger 62 thereon is against abutment 60, the housing and signal will be disposed in the solid line position in Figure 7.

When the lever 45 is moved to the right and upwardly to dispose the right hand finger 62 against abutment 61, the housing and signal will be disposed in the upper dotted position in Figure 7. By moving the operating lever to neutral position and upwardly, the housing and signal will assume the lower dotted line position in Figure 7. Thus, the three positions to signal "left turn," "right turn" and "slow" or "stop" are executed in the manner explained.

The arrangement shown in Figure 9 is disclosed merely to reveal the possible use of meshed gears 63 and 64 in 2 to 1 ratio in place of a belt and pulley, such as earlier described, to actuate the signal through the housing. Otherwise, the structure is identical to the showing in Figures 7, 8 and 10.

Manifestly, the construction as shown and described is capable of some modification and such modification as may be construed to fall within the scope and meaning of the appended claims is also considered to be within the spirit and intent of the invention.

What is claimed is:

1. In a hand signal for an automobile, the combination comprising a signal mounting, a stationary tube extending through the frame of said automobile and having its outer end anchored in said mounting, a signal housing pivoted for arcuate displacement on the outer end of said signal mounting, a shaft extending transversely through said signal housing, a grooved wheel on said shaft within said housing, a collar rotatable on said shaft and affixed to said housing, a first pulley secured to said collar, a second shaft in said signal housing, a second grooved wheel on said second shaft, a cable operating on said grooved wheels, a signal hand attached to said second shaft for operative displacement into and out of said signal housing, a second housing affixed to the inner end of said tube having spaced apart walls, a second pulley rotatable between said walls, the opposed and foremost edges of said walls being arcuately shaped and having predeterminately positioned abutments formed therein, a signal operating lever attached to said second pulley, a pair of pulleys in said second housing adjacent said second pulley, an endless cable operable on said first pulley, said pair of pulleys and said second pulley through said tube and effective to cause arcuate displacement of said signal hand with respect to said signal housing at twice the speed of said signal housing when said operating lever is actuated, a finger affixed to each side of said lever and engageable selectively with the abutments of the walls of said second housing for predetermining the position of said lever to correspondingly predetermine the position of said signal hand.

2. In a hand signal for an automobile, the combination comprising a signal mounting member, a tube having one end secured in said mounting member and extending through the inner and outer walls of the body of said automobile adjacent the operator's seat, a signal housing pivoted to the outer end of said mounting member for arcuate displacement in a vertical plane, spaced apart shafts in said signal housing, one of said shafts extending laterally from said housing, a grooved wheel on each of said shafts interiorly of said housing, a first pulley freely mounted on said extended shaft but affixed to said housing, a cable on said grooved wheels, a hand signal mounted on one of said shafts for arcuate displacement into and out of said signal housing, a second housing mounted on the opposite end of said tube, a large pulley rotatable in said second housing, a pair of pulleys adjacent said large pulley, a cable belt operating on said large pulley and said first pulley over said pair of pulleys and through said tube to actuate said signal housing and to rotate said extended shaft to rotate said hand signal in the same direction as said signal housing but at increased speed, a lever for rotating said large pulley in said second housing, said second housing having spaced apart walls between which said operating lever is adapted to oscillate, abutments spaced predeterminately on said walls, downwardly projecting fingers carried by said lever for selective engagement with said abutments for predetermining the position of said operating lever to correspondingly predetermine the position of said hand signal.

ADOLPH E. ASHLEMAN.

REFERENCES CITED

The following references are of record in the file of this patent:

UNITED STATES PATENTS

| Number | Name | Date |
|---|---|---|
| 1,470,617 | Cummings | Oct. 16, 1923 |
| 1,713,004 | Reuber | May 14, 1929 |
| 1,768,034 | Deblieux | June 24, 1930 |